(12) United States Patent
Defrance et al.

(10) Patent No.: US 8,740,147 B2
(45) Date of Patent: Jun. 3, 2014

(54) PRESSURE RELIEF LATCH

(75) Inventors: Vincent Defrance, Bourges (FR); Marc Roussy, Quincy (FR); Etienne Luneau, Segry (FR)

(73) Assignee: LISI Aerospace (FR)

( * ) Notice: Subject to any disclaimer, the term of this patent is extended or adjusted under 35 U.S.C. 154(b) by 128 days.

(21) Appl. No.: 13/558,291

(22) Filed: Jul. 25, 2012

(65) Prior Publication Data

US 2013/0043350 A1  Feb. 21, 2013

(30) Foreign Application Priority Data

Jul. 26, 2011 (FR) .................................... 11 56786

(51) Int. Cl.
*B64C 1/14* (2006.01)
(52) U.S. Cl.
USPC ............... 244/129.4; 244/129.5; 292/113; 292/123; 292/256.5
(58) Field of Classification Search
USPC ......... 244/129.4, 129.5; 292/113, 123, 256.5, 292/161
See application file for complete search history.

(56) References Cited

U.S. PATENT DOCUMENTS

| | | | | |
|---|---|---|---|---|
| 4,230,352 A | * | 10/1980 | Sealey et al. | 292/341.17 |
| 5,289,615 A | * | 3/1994 | Banks et al. | 16/366 |
| 5,765,883 A | * | 6/1998 | Dessenberger et al. | 292/92 |
| 6,454,210 B1 | * | 9/2002 | Plattner | 244/129.5 |
| 6,513,841 B1 | * | 2/2003 | Jackson | 292/214 |
| 6,755,448 B2 | * | 6/2004 | Jackson et al. | 292/113 |
| 7,578,475 B2 | * | 8/2009 | Pratt et al. | 244/129.4 |
| 2002/0195827 A1 | | 12/2002 | Jackson et al. | |
| 2006/0049560 A1 | | 3/2006 | Chun et al. | |

FOREIGN PATENT DOCUMENTS

| EP | 1 197 619 B1 | 4/2002 |
|---|---|---|
| WO | WO 2011/069108 A1 | 6/2011 |

OTHER PUBLICATIONS

Reclusa, Larrañeta, Preliminary Search Report, Mar. 16, 2012, 7 pages, Institut National de la Propriété Industrielle, France.

* cited by examiner

*Primary Examiner* — Christopher P Ellis
(74) *Attorney, Agent, or Firm* — Henricks, Slavin & Holmes, LLP

(57) ABSTRACT

The invention relates to a pressure relief latch for aircraft, able to absorb vibrations and shocks without inopportune opening, as well as to adapt to dimensional stresses during its assembly. The latch includes: a console, a lever mounted on the console, and an opening effort exerted on a fulcrum of the lever causing an angular displacement of the fulcrum between a closing position and an opening position. The latch also includes a roller able to roll against a profile of the lever and connected to an elastic return device. The latch further being provided with means able to vary the angular displacement of the fulcrum of the lever according to the opening effort, with two different slopes according to an opening effort E1.

14 Claims, 3 Drawing Sheets

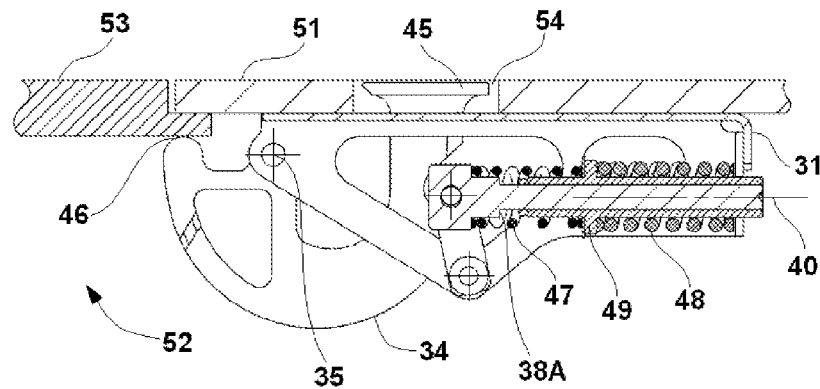
Fig. 3
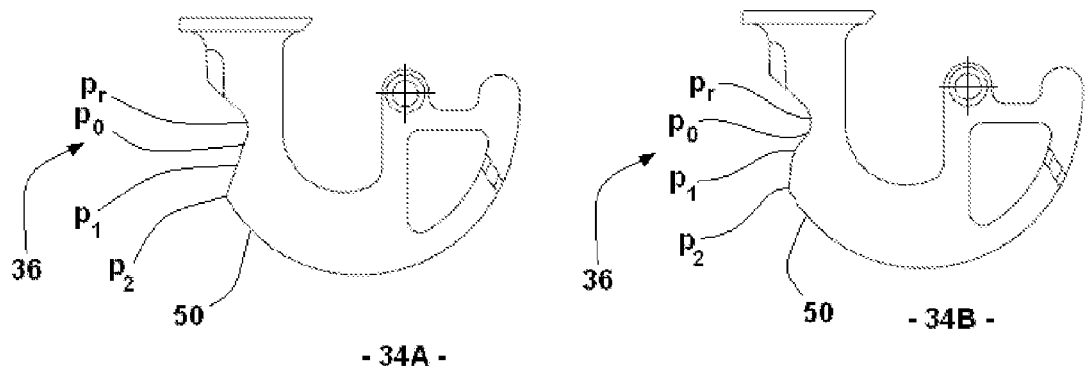
Fig. 4A
Fig. 4B
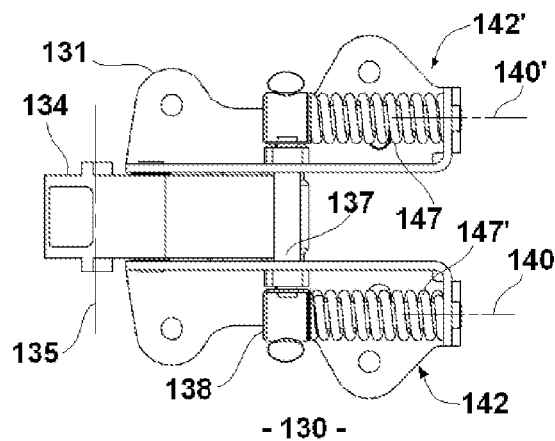
Fig. 6A

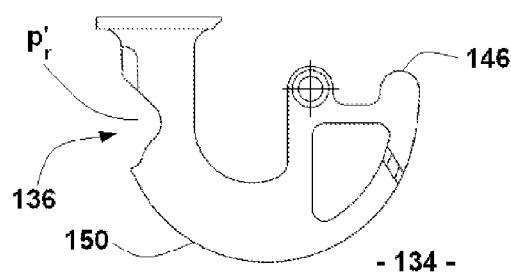 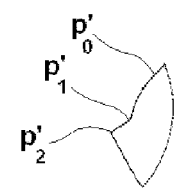
Fig. 6BFig. 6C
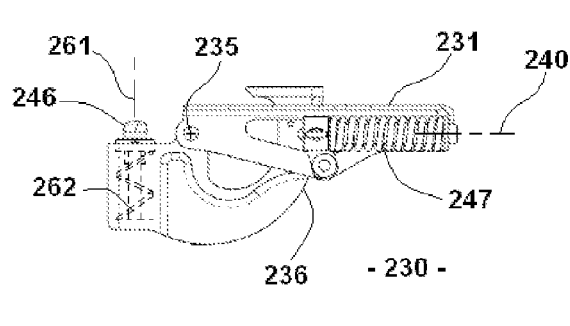 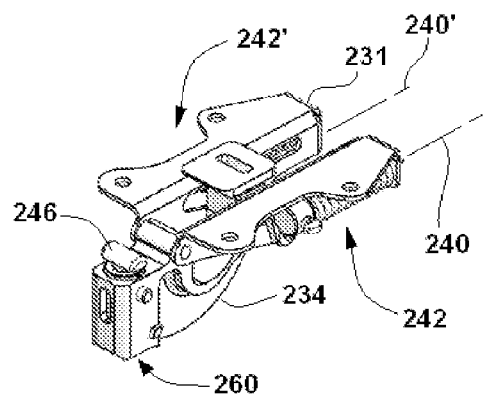
Fig. 7AFig. 7B

PRESSURE RELIEF LATCH

The present invention refers to a pressure relief latch, in particular for aircrafts.

A pressure relief latch is typically used for fixing a panel to an aircraft structure. When the pressure increases in a compartment delimited by the panel, the latch opens automatically when said pressure exceeds a given value. Degradations of the aircraft, due to overpressure, are thus avoided.

Figure 1:
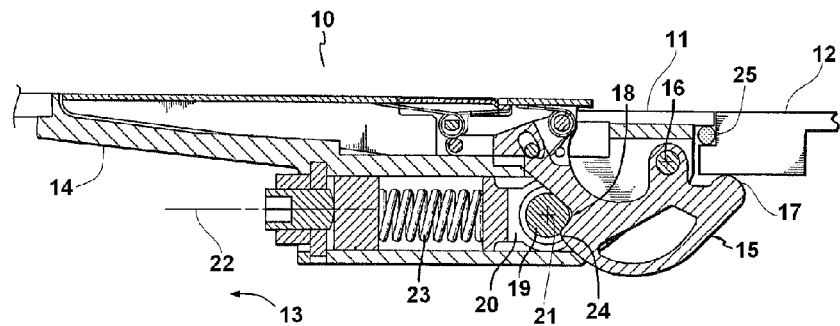

FIG. 1 represents a pressure relief latch of the state of the art, as described in particular in document EP1197619.

The latch 10 makes it possible to assemble a panel 11 with a structure 12 of an aircraft. The panel 11 closes a compartment 13, in which the pressure is likely to increase. In FIG. 1, the latch 10 is in the closing position of the panel 11.

The latch 10 comprises a console 14 fixed to the panel 11. A lever 15 is able to rotate relative to the console, about an axis 16 substantially parallel to the panel 11. A round end 17 of the lever is in contact with the structure 12.

The lever moreover comprises a profile 18, in contact with a cylindrical roller 19. The roller 19 is mounted on a support 20, so as to rotate about an axis 21 parallel to the axis of rotation 16 of the lever.

The support 20 is able to translate relative to the console 14, along an axis 22 perpendicular to the axes (16, 21) and substantially parallel to the panel 11.

The support 20 is in contact with an end of a helical compression spring 23, arranged parallel to the axis 22. Another end of the spring is connected to the console 14.

When the pressure increases in the compartment 13, the structure 12 exerts a force on the end 17 of the lever 15, which tends to make said lever turn about its axis 16. This force is compensated at the beginning by the effort exerted by the spring 23 on the profile 18 of the lever, via the roller 19.

When the pressure in the compartment 13 has reached a sufficient level, a little rotation of the lever 15 about the axis 16 causes the roller 19 to move towards a nose 24 of the profile 18, which compresses the spring 23. When the force exerted on the lever by the structure exceeds that exerted by the roller 19, said roller goes beyond the nose 24. The lever is not retained in the closing position anymore and can rotate completely, which starts the opening of the panel 11.

One calls "opening effort" the effort exerted by the structure 12 on the end 17 of the lever 15.

In the case of a latch 10 as represented in FIG. 1, the rotation displacement of the lever 15, and thus the displacement of the roller 19 about the axis 22, depends on the opening effort. This variation follows a curve which depends on the mechanical characteristics of the spring 23 and the profile 18 of the lever.

Pressure relief latches are used in particular for closing overpressure doors for engine nacelle pylons, the latter connecting engines to aircraft structures. Theses parts of the aircraft are subjected to important mechanical stresses during flights. It is advantageous that a pressure relief latch is able to absorb many shocks and vibrations, without opening in an inopportune way.

Moreover, last generation aircrafts are submitted to severe aerodynamic criteria, in order to optimize fuel consumption. A sealing joint 25 can be placed between the structure 12 and the panel 11. The crushing of this joint must be ensured by the latch 10, without the reaction effort from said joint not starting an inopportune opening of the latch.

In addition, the latch must adapt to the dimensional variations tolerated for manufacturing the doors and the other parts of an aircraft structure. In the former art, adjustments are made by means of washers placed between the console 14 and the panel 11 when assembling the latch, in order to optimize the distance between said console and said panel. However, these adjustments generate assembling stresses and increase the aircraft weight.

In order to solve these problems, the object of the invention is a latch which improved compared to the state of the art. In particular, the invention makes it possible to vary the displacement of the lever according to the opening effort, so as to provide:

a first range of effort, between a minimal opening effort $E_0$ and an intermediate opening effort $E_1$. In this first range, the function 'displacement of the lever=f(opening effort)' has a high slope; in other words, the lever moves in order to adapt to shocks and dimensional variations, without starting an inopportune opening of the latch;

a second range of effort, between the effort $E_1$ and a maximum opening effort $E_2$. In this second range, the function 'displacement of the lever=f(opening effort)' has a low slope. The pressure can then increase in the compartment closed by the latch, before reaching a critical opening effort threshold $E_2$, beyond which the opening of the latch is started.

An object of the invention is thus a pressure relief latch for assembling in a removable way an aircraft panel with an aircraft structure, said latch including: a console able to be connected to a panel; a lever mounted on the console, able to rotate about a first axis, an opening effort (E) exerted on a fulcrum of the lever causing an angular displacement (D) of said fulcrum relative to the first axis, between a closing position and an opening position; a roller arranged along a second axis substantially parallel to the first axis, able to roll against a profile of the lever when said lever moves between said positions, said roller being connected to a first end of at least one elastic return device, a second end of said device being connected to the console; the latch being characterized in that it is provided with means able to vary the angular displacement (D) of the fulcrum of the lever according to the opening effort so that:

between a minimal opening effort $E_0$ and an intermediate opening effort $E_1$, the function $D=f(E)$ has a slope higher than a value (X), between the intermediate opening effort $E_1$ and a maximum opening effort E2, the function $D=f(E)$ has a slope lower than said value (X).

Said maximum effort $E_2$ corresponds to a maximum pressure between the panel and the structure, the opening of the latch being started beyond this maximum pressure. The means able to vary the displacement (D) are supported by the elastic return device and/or the profile of the lever and/or the fulcrum of the lever.

According to a first embodiment of the invention, the means for varying the displacement of the lever according to the opening effort comprise two springs arranged in series, a first spring having a stiffness (k) lower than a stiffness (k') of a second spring.

The total stiffness of the whole is lower than the lowest stiffness (k). The function $D=f(E)$ varies first strongly, up to a maximum level of stress reached by the first spring. The function $D=f(E)$ has then a lower slope, only the stiffest spring reacting to the opening effort.

A possible alternative to the springs is a mechanism such as a hydraulic or pneumatic cylinder.

Within the scope of the invention, it is possible to use various types of springs, for example torsional springs. However, the two springs in series are preferentially two helical compression springs, arranged in series along a third axis perpendicular to the first and the second axes.

According to a preferential embodiment of the invention, the latch includes a stop able to slide along the third axis, such that, when the lever is subjected to the intermediate opening effort $E_1$, the first helical spring is maximally compressed between said stop on the one hand and the roller or the console on the other hand.

According to a second embodiment of the invention, the means for varying the opening effort according to the displacement of the lever comprise: a first part of the lever profile, between points ($p_0$, $p_1$) corresponding to a position of the roller on said profile when the opening effort corresponds respectively to the values ($E_0$, $E_1$); a second part of the profile, between points ($p_1$, $p_2$) corresponding to a position of the roller on said profile when the opening effort corresponds respectively to the values ($E_1$, $E_2$); an angle formed by the segments ($p_0$, $p_1$) and ($p_1$, $p_2$) having a concavity oriented towards the roller.

In the second part of the profile, a greater effort is necessary to move the lever. The slope of the function D=f(E) is thus lower for the higher values of E than for the lower values.

Such a lever profile in two parts can be possibly used in combination with the two previously-described springs in series.

Another embodiment of the invention makes it possible to provide the lever with an adaptive capability for the lower efforts exerted by the structure.

According to this embodiment, the lever comprises a second elastic return device, mobile in compression along a third axis substantially perpendicular to the first and the second axes, an end of said second device being connected to the fulcrum of the lever, a stiffness (k) of the second device being lower than a stiffness (k') of the first device.

Thus, the weakest efforts, exerted by the structure on the lever, can be absorbed by the deformation of the second elastic return device. These weakest efforts relate in particular to the dimensional stresses during the installation of the latch, as well as the vibrations and the shocks during the operation of the aircraft. In this manner, one avoids inopportune openings of the latch, nonrelated to an overpressure in the compartment closed by the panel with said latch.

According to a preferential embodiment of the invention, the second elastic return device comprises a helical compression spring of stiffness k. In the same way, preferentially, the first elastic return device comprises a helical compression spring of stiffness k', arranged along a fourth axis perpendicular to the first and the second axes.

According to a preferential embodiment of one of the above-described objects of the invention, the latch includes two elastic return devices, said identical devices being arranged along two parallel axes, each device being connected to an end of the roller.

According to a preferential embodiment of the above-described objects of the invention, the roller is connected to the console by means of a rod. An alternative is possible, in which the roller is able to slide along a slide integral with the console.

An object of the invention is also an aircraft provided with a pressure relief latch such as one of the above-described objects of the invention, said latch assembling in a removable way a panel with a structure, the console being connected to the panel and the fulcrum of the lever being able to come into contact with the structure.

Figure 2A:
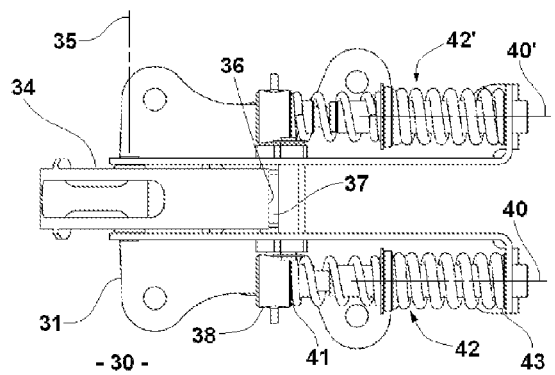
Figure 2B:
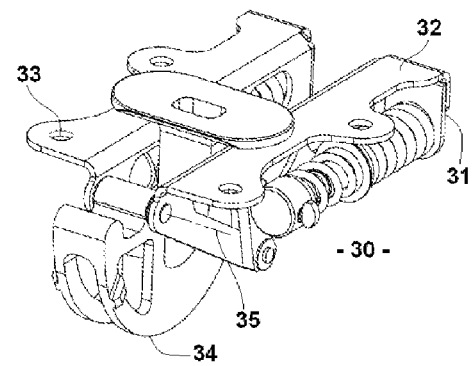
Figure 2C:
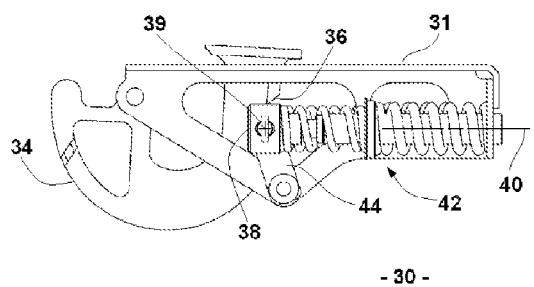
Figure 5:
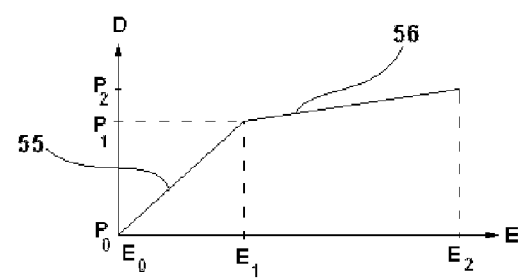

The various aspects of the invention will be better understood when reading the following description and examining the annexed Figures. Those are given as an indication. The Figures show:

FIG. 1, already described: a sectional view of a latch of the state of the art;

FIGS. 2A, 2B, 2C: views of a latch according to a first embodiment of the invention;

FIG. 3: a view of the latch in FIGS. 2A-2C mounted to an aircraft structure;

FIGS. 4A, 4B: partial views of the latch in FIGS. 2A-2C;

FIG. 5: a graphical representation of the displacement of the fulcrum of the lever according to the variation of the opening effort;

FIGS. 6A, 6B, 6C: views of a latch according to a second embodiment of the invention;

FIGS. 7A, 7B: views of a latch according to a third embodiment of the invention.

FIG. 2A represents a latch 30 according to an embodiment of the invention, in a bottom view. By "bottom view", one considers that the top of the latch is oriented towards a panel said latch is likely to be fixed to, the bottom being oriented towards the compartment closed by such a panel. FIG. 2B represents the latch 30 in a perspective view. FIG. 2C represents the latch 30 in a side view.

The latch 30 comprises a console 31. Said console comprises a substantially plane upper surface 32, for coming into contact with an aircraft panel. The surface is provided with holes 33 for the fixation to said panel. A lever 34 is able to rotate relative to the console, about an axis 35 substantially parallel to the surface 32.

The lever comprises a profile 36, in contact with a cylindrical roller 37. The roller 37 is mounted on a support 38, rotating about an axis 39 parallel to the axis of rotation 35 of the lever.

The support 38 is mobile relative to the console 31, by means of a rod 44. The support 38 is in particular able to translate along an axis 40 perpendicular to the axes (35, 39) and substantially parallel to the surface 32. The support 38 slides inside a shouldered spacer forming a stop 49.

The support 38 is in contact with an end 41 of an elastic return device 42, arranged along the axis 40. Another end 43 of the device 42 is connected to the console 31, against which it presses.

In FIGS. 2A, 2B, 2C, the latch 30 is represented with the lever 34 in the rest position $P_r$. One considers Pr, as well as the other below-mentioned positions, as the angular positions of the lever 34 relative to the console 31 and the axis 35.

This rest or closing position $P_r$ corresponds to a minimal compression of the device 42. In this position Pr, the roller 37 is in contact with a point $p_r$ of the profile 36 (see FIG. 3), said point corresponding to the shortest distance of said profile from the axis 35.

FIG. 3 shows a sectional side-face view of the latch in FIGS. 2A-2C mounted on an aircraft panel.

The latch 30 is in particular mounted on a panel 51, which closes a compartment 52. The latch 30 associates the panel 51 with a structure 53.

The panel 51 comprises an opening 54, through which a part 45 of the lever 34 can move, when said lever pivots about the axis 35.

In addition, the lever 34 comprises a fulcrum 46, which comes into contact with the structure 53 when the panel 51 is closed.

It is considered that in FIG. 3 the lever is in a position $P_0$ relative to the console 31 and the axis 35. This position corresponds to a minimal effort $E_0$ exerted by the structure 53 on the fulcrum 46. Preferably, in the position $P_0$ of the lever, the device 42 is slightly compressed, i.e. the roller 37 is further away from the axis 35 than in the rest position $P_r$.

When the pressure increases in the compartment 52, the effort exerted by the structure 53 on the point 46 increases, which generates a rotation of the lever about the axis 35. The roller 37 then moves along the profile 36. Said profile is configured so that the distance between the roller 37 and the axis 35 starts to increase, from the position $P_0$.

Two examples 34A and 34B of levers 34 are respectively represented in FIGS. 4A and 4B. These Figures show the profiles 36 of said levers, more particularly the points ($p_r$, $p_0$) in contact with the roller 37 respectively in the rest position $P_r$ and the position $P_0$ of minimal effort.

In the example represented in FIGS. 2A, 2B, 2C and 3, the elastic return device 42 comprises two helical compression springs (47, 48), mounted in series on the support 38 and the stop 49, along the axis 40. A first spring 47 is connected at an end 41 to the support 38. A second spring 48 is connected at an end 43 to the console 31. The stop 49, sliding on the support 38 along the axis 40, is connected to the other end of the helical springs (47, 48).

The first spring 47 has a stiffness k lower than a stiffness k' of the second spring 48. When the lever 34 pivots from the position $p_0$, the springs (47, 48) are compressed because of the displacement of the roller 37 along the profile 36 and the axis 40.

In an alternative, the second spring 48 can have a stiffness k lower than a stiffness k' of the first spring 47: whatever the arrangement of the springs, the one with the lowest stiffness will become compressed first.

It is known that the total stiffness k" of the springs (47, 48) in series can be expressed according to the following formula:

$$1/k''=1/k+1/k'$$

The total stiffness k' is thus lower than the lowest stiffness k of the springs (47, 48). When the roller 37 is near the point $p_0$, the angular displacement D of the lever 34, relative to the console 31 and the axis 35, varies in an important way according to the opening effort E exerted on the fulcrum 46.

The first spring 47 with the lowest stiffness undergoes the most important compression between the support 38 and the stop 49. When the roller reaches a point $p_1$ of the profile 36, corresponding to a position $P_1$ of the lever 34, the spring 47 reaches a maximum level of compression. A shoulder 38A of the support 38 thus comes against the stop 49. In an alternative, the support 38 does not comprise any shoulder and the spring 47, when maximally compressed, has contiguous turns and comes against the stop 49. This position $P_1$ of the lever corresponds to an intermediate opening effort $E_1$ exerted on the fulcrum 46.

From the position $P_1$ of the lever, it is the stiffness k' of the second spring 48 that represents the total stiffness k" of the device 42. From said position $P_1$, the angular displacement D of the lever 34 varies more slightly according to the opening effort E exerted on the fulcrum 46.

The rotation of the lever 34 between the positions $P_0$ and $P_1$ enables the latch 30 to adapt to the dimensional variations during the assembly on the panel 51, as well as to absorb vibrations and shocks during use.

Regarding the rotation of the lever beyond the position $P_1$, it corresponds to a reaction of the latch 30 to the increase in the pressure in the compartment 52.

The profile 36 (4A, 4B) comprises a nose $p_2$ corresponding to a position $P_2$ of the lever 34. Said position corresponds to a maximum opening effort $E_2$, connected with a maximum threshold of pressure in the compartment 52. Beyond this threshold, the roller 37 reaches a part 50 of the profile 36, where the distance from the axis 35 decreases. The return device 42 relaxes, which causes the complete swing of the lever 34 into an opening position. The fulcrum 46 thus is not anymore in contact with the structure 53. The overpressure in the compartment 52 starts then the opening of the panel 51.

FIG. 5 is a schematic representation of a curve D=f(E) of the latch 30 in FIG. 3, the lever 34 being the example 34B in FIG. 4B. The origin of the curve corresponds to the minimal effort $E_0$, the lever being in the position $P_0$.

The curve D=f(E) has a first part 55, substantially linear when the effort varies between $E_0$ and $E_1$. Between $E_1$ and $E_2$, the curve has a second part 56 which is also linear with a lower slope.

One considers a value X, lower than the slope of the first part 55 and higher than the slope of the second part 56. The value X depends in particular on the stiffnesses (k, k') of the springs (47, 48) and of the shape of the profile 36.

In the example in FIG. 4B, the profile 36 has a sinusoidal shape, so that the curve E=f(D) has two substantially linear parts (55, 56). However, it is possible to define the profile 36 with a different shape; the parts (55, 56) of the curve can be nonlinear. For example, in FIG. 4A, the profile 36 has a substantially flat shape.

In a preferential way, the latch 30 comprises a double elastic return device (42, 42'). The two devices (42, 42') are identical, along two parallel axes (40, 40'), each device being connected to an end of the roller 37.

FIG. 6A represents a latch 130 according to another embodiment of the invention. The latch 130 is similar to the previously-described latch 30 in that it comprises a console 131 on which a lever 134 is mounted so as to rotate about an axis 135. The lever 134 has a fulcrum 146 (FIG. 6B) for coming into contact with a structure. The lever 134 comprises a profile 136 on which a roller 137 can roll. The roller is pivotally mounted on a support 138, connected to an end of two elastic return devices (142, 142'), said devices being identical and compressible along two parallel axes (140, 140') perpendicular to the axis 135.

Contrary to the latch 30, the elastic return devices (142, 142') of the latch 130 comprise only one helical spring (147, 147') of stiffness k'.

FIG. 6B represents a view of the lever 134, FIG. 6C being a view of a detail of the profile 136. One distinguishes the rest point $p'_r$, the roller 137 in the closing position of the latch 130 is in contact with. Said latch is configured so that, when it is mounted on an aircraft panel as in FIG. 3, the roller 137 is in contact with a point $p'_0$ slightly further away from the axis 135 than the rest point $p'_r$. When the lever 134 pivots around its axis, the roller 137 moves towards a point $p'_1$, then towards a nose $p'_2$. Beyond the nose $p'_2$, the roller 137 is in contact with a part 150 of the profile 136 whose distance from the axis 135 decreases, which causes the complete opening of the latch.

As it can be seen in FIGS. 6B and 6C, the points ($p'_0$, $p'_1$, $p'_2$) form an angle whose concavity is oriented towards the roller 137. Thus, the roller 137 can press on the hollow of said angle. The profile 136 is designed so that, between $p'_0$ and $p'_1$, the distance between the roller and the axis 135 increases slowly relative to the displacement of the roller along the axis 140. Between $p'_1$ and $p'_2$, the distance between the roller and the axis 135 increases more quickly relative to said displacement of the roller.

Thus, as in the preceding example, one obtains a curve D=f(E) which has a first part with a high slope and a second part with a lower slope. The first part enables the latch to adapt to the dimensional variations and to absorb shocks and vibrations without opening inopportunely.

It is also possible to combine, in the same latch, the two springs (47, 48) in series and a lever profile similar to the profile 136.

FIGS. 7A and 7B represent views of a latch 230 according to another aspect of the invention.

Just as latches 30 and 130, the latch 230 is intended to assemble in a removable way a panel with an aircraft structure.

The latch 230 includes a console 231 able to be connected to an aircraft panel. The console 231 has a shape similar to that of the consoles 31 and 131. A lever 234 is mounted on the console so as to rotate about an axis 235. The lever comprises a profile 236 on which a roller 237 can roll. The roller is rotatingly mounted on a support 238, connected to an end of two elastic return devices (242, 242'), said devices being identical and compressible along two parallel axes (240, 240') perpendicular to the axis 235. The devices (242, 242') are similar to the devices (142, 142') of the latch 130. More precisely, the device 242 comprises only one helical spring 247 of stiffness k'.

The profile 236 of the lever 234 is for example the profile 36 represented in FIG. 4A. It can also be a profile 136 as represented in FIG. 6B.

In addition, the lever 234 comprises a support element 246, for coming into contact with an aircraft structure, such as the structure 53 in FIG. 3. The element 246 is connected to a third elastic return device 260, compressible along an axis 261 perpendicular to the axis 135. The device 260 includes for example a helical compression spring 262. Said spring 262 has a stiffness k lower than the stiffness k' of the spring 247.

Thus, when the latch 230 is mounted on an aircraft as represented in FIG. 3, the support element 246 comes into contact with the structure of said aircraft. During the assembly, the dimensional variations of the latch and/or the structure are compensated by a more or less great compression of the spring 262 along the axis 261. In the same way, this compression makes it possible to absorb vibrations and shocks, without starting the opening of the latch 230.

In this case, one observes a displacement D of the element 246 relative to the console 231 and the axis 235, without the lever 234 rotating about said axis 235. Although the movement of the element 246 is axial for weak efforts E, one can consider that D is its angular displacement relative to the console 231 and the axis 235.

When the pressure increases in a compartment closed by the latch 230, the effort exerted by the structure on the latch 230 increases. Beyond a certain level of pressure, the spring 262 reaches a maximum threshold of compression. An increase in the pressure then generates a rotation of the lever 234 about the axis 235. The displacement D of the element 246 corresponds in this case to an effective rotation of the lever.

The technical result obtained with the latch 230 is thus identical to that obtained with the latches (30, 130). Indeed, the latch 230 has an element able to become deformed according to a first range of effort, in order to absorb dimensional variations or shocks without starting the opening of the latch. A second range of effort exerted on the lever then ends in the opening of the pressure relief latch according to a known operation.

The invention claimed is:

1. Pressure relief latch (30, 130, 230) for assembling in a removable way an aircraft panel (51) with an aircraft structure (53), said latch including:
a console (31, 131, 231) able to be connected to the panel (51);
a lever (34, 134, 234) mounted on the console so as to rotate about a first axis (35, 135, 235),
an opening effort (E) exerted on a fulcrum (46, 146, 246) of the lever causing an angular displacement (D) of said fulcrum relative to the first axis, between a closing position and an opening position,
a roller (37, 137, 237) arranged along a second axis (39) substantially parallel to the first axis, able to roll against a profile (36, 136, 236) of the lever when said lever moves between said positions,
said roller being connected to a first end (41) of at least one elastic return device (42, 142, 242), one second end (43) of said device being connected to the console,
the latch being characterized in that it is provided with means (47, 48, 136, 260) able to vary the angular displacement (D) of the fulcrum of the lever according to the opening effort so that:
between a minimal opening effort $E_0$ and an intermediate opening effort $E_1$, the function D=f(E) has a slope higher than a value (X),
between the intermediate effort $E_1$ and a maximum opening effort $E_2$, the function D=f(E) has a slope lower than said value (X),
said maximum effort $E_2$ corresponding to a maximum pressure between the panel and the structure, beyond which the opening position is reached,
said means (47, 48, 136, 260) being supported by the elastic return device and/or the profile of the lever and/or the fulcrum of the lever.

2. Latch according to claim 1, wherein the means for varying the displacement (D) according to the opening effort (E) comprise two springs (47, 48) in series, a first spring (47) having a stiffness (k) lower than a stiffness (k') of a second spring (48).

3. Latch according to claim 2, wherein the elastic return device comprises two helical compression springs, arranged in series along a third axis (40) perpendicular to the first and the second axes (35, 39).

4. Latch according to claim 3, including a stop (49) sliding along the third axis so that, when the lever is subjected to the intermediate opening effort $E_1$, the first helical spring (47) is maximally compressed between the said stop on the one hand and the roller or the console on the other hand.

5. Latch (130) according to claim 1, wherein the means for varying the opening effort according to the displacement of the lever comprise:
a first part of the profile (136) of the lever, located between points ($p_0$, $p_1$) corresponding to a position of the roller on said profile when the opening effort corresponds respectively to the values ($E_0$, $E_1$);
one second part of the profile, located between points ($p_1$, $p_2$) corresponding to a position of the roller on said profile when the opening effort corresponds respectively to the values ($E_1$, $E_2$);
an angle formed by the segments ($p_0$, $p_1$) and ($p_1$, $p_2$) on the hollow of which the roller (137) can press.

6. Latch (230) according to claim 1, wherein the lever comprises a second elastic return device (260), mobile in compression along a third axis (261) substantially perpendicular to the first and the second axes, an end of said second device being connected to the fulcrum (246) of the lever, a stiffness (k) of the second device being lower than a stiffness (k') of the first device.

7. Latch according to claim 6, wherein the second elastic return device comprises a helical compression spring (262) of stiffness (k).

8. Latch according to claim 6 or claim 7, wherein the first elastic return device comprises a helical compression spring (247) of stiffness (k'), arranged along a fourth axis (240) perpendicular to the first and the second axes.

9. Latch according to claim 1, wherein the roller is connected to the console by means of a rod (44).

10. Latch according to claim 1, wherein the roller is able to slide along a slide integral with the console.

11. Aircraft provided with a pressure relief latch according to claim 1, said latch assembling in a removable way a panel (51) with a structure (53), the console being connected to the panel and the fulcrum (46, 146, 246) of the lever being able to come into contact with the structure.

12. Latch according to any one of the claims 6 and 7, including two elastic return devices (42, 42'; 242, 242'), said devices being identical, arranged along two parallel axes (40, 40'; 240, 240'), each device being connected to an end of the roller.

13. Latch according to claim 5, including two elastic return devices (42, 42'; 242, 242'), said devices being identical, arranged along two parallel axes (40, 40'; 240, 240'), each device being connected to an end of the roller.

14. Latch according to claim 8, including two elastic return devices (42, 42'; 242, 242'), said devices being identical, arranged along two parallel axes (40, 40'; 240, 240'), each device being connected to an end of the roller.

\* \* \* \* \*